United States Patent
Yasui et al.

(10) Patent No.: US 12,222,700 B2
(45) Date of Patent: Feb. 11, 2025

(54) CONTROL DEVICE

(71) Applicant: OMRON Corporation, Kyoto (JP)

(72) Inventors: Yuto Yasui, Kyoto (JP); Junji Shimamura, Kyoto (JP); Masahiko Nakano, Kyoto (JP); Takafumi Okura, Kyoto (JP); Tomonori Shimamura, Kyoto (JP)

(73) Assignee: OMRON CORPORATION, Kyoto (JP)

(*) Notice: Subject to any disclaimer, the term of this patent is extended or adjusted under 35 U.S.C. 154(b) by 506 days.

(21) Appl. No.: 17/598,656

(22) PCT Filed: Mar. 5, 2020

(86) PCT No.: PCT/JP2020/009433
§ 371 (c)(1),
(2) Date: Sep. 27, 2021

(87) PCT Pub. No.: WO2020/203019
PCT Pub. Date: Oct. 8, 2020

(65) Prior Publication Data
US 2022/0171364 A1    Jun. 2, 2022

(30) Foreign Application Priority Data
Mar. 29, 2019    (JP) ................................ 2019-066586

(51) Int. Cl.
*G05B 19/404*        (2006.01)

(52) U.S. Cl.
CPC .. *G05B 19/404* (2013.01); *G05B 2219/50218* (2013.01)

(58) Field of Classification Search
None
See application file for complete search history.

(56) References Cited

U.S. PATENT DOCUMENTS

2006/0267528 A1    11/2006 Rehm
2006/0279241 A1    12/2006 Tsutsui et al.
(Continued)

FOREIGN PATENT DOCUMENTS

| CN | 1856930 A | 11/2006 |
| EP | 3065012 A2 * | 9/2016 | ........... G05B 19/404 |

(Continued)

OTHER PUBLICATIONS

International Search Report issued in Intl. Appln. No. PCT/JP2020/009433 mailed Jun. 9, 2020. English translation provided.
(Continued)

*Primary Examiner* — Sean Shechtman
(74) *Attorney, Agent, or Firm* — ROSSI, KIMMS & McDOWELL LLP

(57) ABSTRACT

A controller includes a calculator, a generator, and an adjuster. The calculator calculates a correction value for a position command based on a transmission delay and a control delay included in outputting the position command from the controller to the slave axis drive. The transmission delay is a delay in transmitting the position command to the slave axis drive. The control delay is a delay in the slave axis drive. The generator generates a corrected position command by applying the correction value to a reference position command for the slave axis drive calculated using position information about the master axis drive. The adjuster adjusts, in a predetermined period from when a speed of the master axis drive changes, the correction value to be below a value calculated by the calculator to cause a position of the slave axis drive to avoid exceeding a position of the master axis drive.

5 Claims, 5 Drawing Sheets

(56) References Cited

U.S. PATENT DOCUMENTS

| | | |
|---|---|---|
| 2013/0002185 A1 | 1/2013 | Hosomi |
| 2015/0362895 A1 | 12/2015 | Horiguchi |
| 2016/0259311 A1 | 9/2016 | Shimamura |
| 2017/0038746 A1 | 2/2017 | Hirose |
| 2017/0364041 A9 | 12/2017 | Hirose |
| 2018/0264650 A1 | 9/2018 | Ojima |

FOREIGN PATENT DOCUMENTS

| | | |
|---|---|---|
| JP | H08263114 A | 10/1996 |
| JP | 2010178510 A | 8/2010 |
| JP | 2013011937 A | 1/2013 |
| JP | 2014119904 A | 6/2014 |
| JP | 2016004435 A | 1/2016 |
| JP | 2016167255 A | 9/2016 |
| JP | 2017033345 A | 2/2017 |
| JP | 2018153882 A | 10/2018 |

OTHER PUBLICATIONS

Written Opinion issued in Intl. Appln. No. PCT/JP2020/009433 mailed Jun. 9, 2020. English translation provided.
Office Action issued in Japanese Appln. No. 2019-066586 mailed Dec. 14, 2021. English machine translation provided.
Office Action issued in Chinese Appln. No. 202080023999.5 mailed Sep. 28, 2023. English translation provided.

\* cited by examiner

FIG. 2
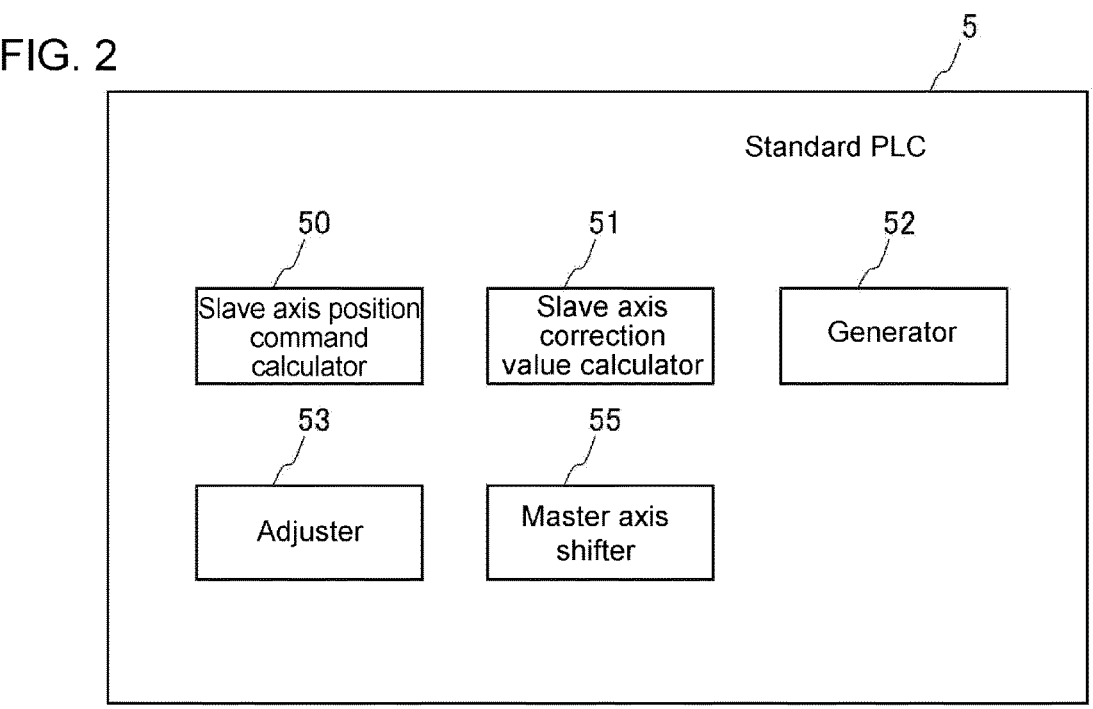
FIG. 3
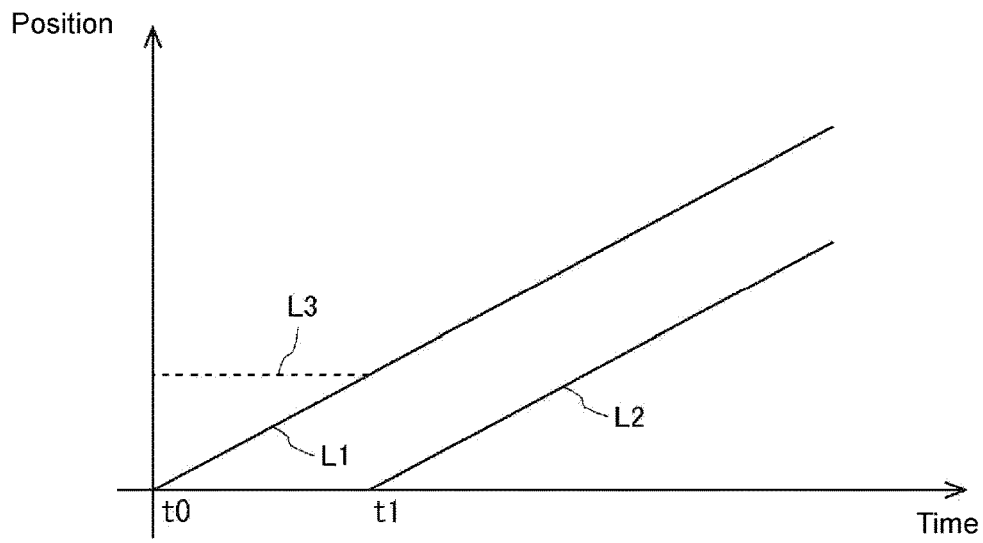
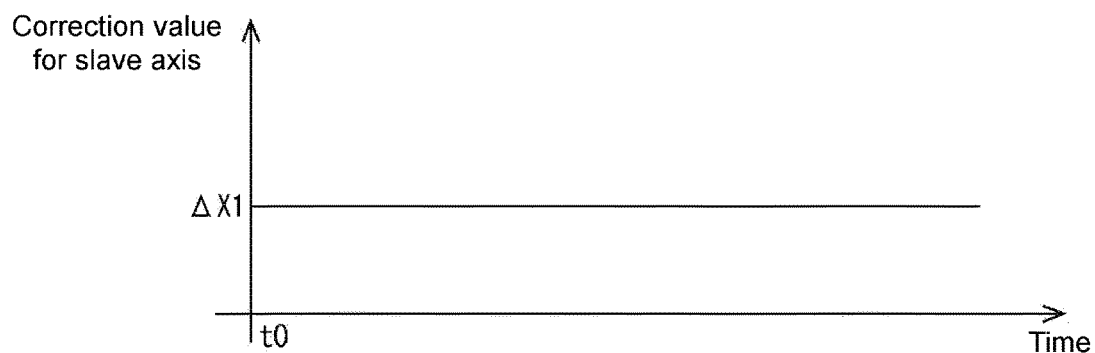

CONTROL DEVICE

FIELD

The present invention relates to a controller for performing synchronization control for synchronizing a master axis drive and a slave axis drive.

BACKGROUND

Controlling the operations of machines and equipment includes motion control for controlling the motions of motors. Motion control includes various control processes of synchronization control using electronic cams and electronic gears. Such synchronization control achieves synchronization between a master axis and a slave axis to allow a predetermined operation to be performed by a work machine including a master axis drive corresponding to the master axis and a slave axis drive corresponding to the slave axis. In synchronization control, a transmission delay in transmitting information obtained by the master axis through measurement and processed to the slave axis can cause a deviation in synchronization between the master axis and the slave axis. For example, Patent Literature 1 describes a technique for correcting such a deviation in synchronization by shifting a measured master axis position using a filter.

Patent Literature 2 describes a controller for synchronization control including a processor that calculates a position command for a slave axis using the position of a master axis and that performs an output to the slave axis in accordance with the position command. Patent Literature 2 also describes a technique for correcting the position command for the slave axis to correct any deviation in synchronization caused by a delay in transmitting the position command to the slave axis and a delay in controlling the slave axis. More specifically, the technique can eliminate a deviation in synchronization caused by a delay associated with the slave axis.

CITATION LIST

Patent Literature

Patent Literature 1: Japanese Unexamined Patent Application Publication No. 2014-119904
Patent Literature 2: Japanese Unexamined Patent Application Publication No. 2016-167255

SUMMARY

Technical Problem

In synchronization control for synchronizing a master axis drive and a slave axis drive as motion control, the controller generates a position command for the slave axis drive and outputs the position command to the slave axis drive. In this case, the generated position command is to be provided to the slave axis drive, and the slave axis drive is also to be controlled by servo control. Actual driving of the slave axis drive under synchronization control involves time for transmission from the controller to the slave axis drive (transmission time) and response time in servo control performed in the slave axis drive. The transmission time and the response time can cause a deviation in synchronization between the master axis and the slave axis, resulting from the slave axis drive. To eliminate susceptibility to such deviations in synchronization, the above known technique includes correcting the position command for the slave axis drive.

However, the position command is corrected with the known technique by directly adding, to the command value for the slave axis drive, a correction value calculated based on the transmission time, the response time, and other factors. This technique allows control for substantially synchronizing the master axis drive and the slave axis drive in steady state in which the slave axis drive is driven at a constant speed. However, immediately after the speed of the master axis drive changes, a correction value can be too large, possibly causing the position of the slave axis drive to exceed the position of the master axis drive and thus failing to perform intended synchronization control. Such unstable synchronization control can affect the performance of a task performed by a work machine that includes the master axis drive and the slave axis drive.

One or more aspects of the present invention are directed to a technique for performing intended synchronization control for synchronizing a master axis drive and a slave axis drive by eliminating a deviation in synchronization between a master axis and a slave axis.

Solution to Problem

In response to the above issue, the structure according to one or more aspects of the present invention uses, in a predetermined period from when the speed of the master axis drive changes, a smaller correction value adjusted from a value calculated based on a transmission delay and a control delay, and generates a position command for the slave axis drive using the adjusted correction value. This eliminates a deviation in synchronization between the master axis and the slave axis that can occur after a speed change.

More specifically, a controller according to an aspect of the present invention is a controller for synchronizing a slave axis drive corresponding to a slave axis with a master axis drive corresponding to a master axis. The controller includes a calculator, a generator, and an adjuster. The calculator calculates a correction value for a position command based on a transmission delay and a control delay included in outputting the position command from the controller to the slave axis drive. The transmission delay is a delay in transmitting the position command from the controller to the slave axis drive. The control delay is a delay in the slave axis drive. The generator generates a corrected position command by applying the correction value to a reference position command for the slave axis drive calculated using position information about the master axis drive. The adjuster adjusts, in a predetermined period from when a speed of the master axis drive changes, the correction value to be below a value calculated by the calculator to cause a position of the slave axis drive to avoid exceeding a position of the master axis drive.

The above controller performs synchronization control for synchronizing the master axis drive corresponding to the master axis and the slave axis drive corresponding to the slave axis. An example of such synchronization control is electronic cam control performed based on an electronic cam profile or electronic gear control performed over the master axis and the slave axis to have a predetermined proportional relation between them. During such synchronization control, the master axis and the slave axis have an intended correlation between them. The master axis drive and the slave axis drive with the correlation cooperate with each other accordingly to allow a work machine including the two drives to perform a predetermined task.

In outputting the position command from the controller to the slave axis drive, a transmission delay and a control delay actually occur. The transmission delay is the time taken for the position command from the controller to reach the slave axis drive. The control delay is the response time in position control performed in the slave axis drive in accordance with the position command (e.g., servo control associated with position). Such delays associated with the slave axis drive can destabilize synchronization control for the master axis and the slave axis. The calculator thus calculates a correction value for correcting the position command based on these delays to eliminate the instability of synchronization control. For example, the product of the speed of the master axis drive and the delay time may be used as the correction value for the position command.

The generator then applies the correction value to the reference position command for the slave axis drive to generate a corrected position command, which is finally output to the slave axis drive. The reference position command is the position command for the slave axis drive to be calculated using position information about the master axis drive without reflecting the delays associated with the slave axis drive. In other words, the reference position command is the position command with which the slave axis drive is drivable without causing any deviation in synchronization between the master axis and the slave axis when none of the above delays associated with the slave axis drive occur.

However, applying the correction value to the reference position command in this manner can be too drastic at the time when the speed of the master axis drive changes. This may possibly cause the position of the slave axis drive to exceed the position of the master axis drive and possibly destabilize the synchronization control. In the above controller, the adjuster adjusts the correction value for the reference position command to be below a value calculated by the calculator in the predetermined period from when the speed of the master axis drive changes. The predetermined period includes the time at which the speed of the master axis drive changes. The length of the predetermined period is determined based on the transmission delay and the control delay described above. The adjustment process reduces drastic changes in any position command for the slave axis drive and thus reduces the likelihood of destabilized synchronization control for the master axis and the slave axis after a speed change.

The correction value is adjusted by the adjuster in the predetermined period. After the predetermined period from when the speed of the master axis drive changes, the correction value without being adjusted by the adjuster, or specifically the correction value calculated by the calculator, may be applied to the reference position command.

In the above controller, the adjuster may adjust the correction value to cause the position of the slave axis drive to match the position of the master axis drive at a change in the speed of the master axis drive. Adjusting the correction value in this manner further reduces the likelihood of destabilized synchronization control for the master axis and the slave axis.

In the above controller, the adjuster may adjust, in the predetermined period, the correction value for the reference position command to gradually approach the value calculated by the calculator over time. In this manner, the correction value is adjusted toward the value calculated by the calculator. A correction value without being adjusted is applied to the reference position command after the predetermined period passes and can cause a smaller change in the position command for the slave axis drive and thus can reduce vibrations of the slave axis drive during synchronization control.

The adjuster may adjust, in the predetermined period, the correction value for the reference position command in a range in which an acceleration of the slave axis drive is below a permissible acceleration. The slave axis drive may have an upper limit for the acceleration for predetermined purposes such as protection of the machine or the user or achieving the accuracy of a predetermined task performed by the machine. The upper limit acceleration is the above permissible acceleration. As described above, the predetermined period is a period of adjustment after a speed change of the master axis drive. The reference position command to which the correction value has been applied may cause the slave axis drive to easily receive an external force. An upper limit is set for the acceleration of the slave axis drive in the predetermined period, thus achieving predetermined purposes associated with the slave axis drive and also promptly reducing a deviation in synchronization between the master axis and the slave axis.

In the above controller, the master axis drive and the slave axis drive may be a pair of a master axis drive and a slave axis drive of a plurality of pairs of master axis drives and slave axis drives included in a work machine. The controller may perform synchronization control to synchronize a master axis drive and a slave axis drive in a pair of the plurality of pairs, and may perform synchronization control to synchronize a master axis drive in a pair of the plurality of pairs and a slave axis drive in another pair of the plurality of pairs. In the controller that controls the plurality of pairs of drives in multiple stages as described above, any deviation in synchronization between drives in one or more pairs upstream can largely affect drives in one or more pairs downstream. However, the controller herein reduces a deviation in synchronization between a master axis and a slave axis that can occur after a speed change of the master axis drive. The controller that controls the plurality of pairs of drives in multiple stages in the machine can thus perform intended synchronization control over the entire machine.

Advantageous Effects

The technique for synchronization control for the master axis drive and the slave axis drive can perform intended synchronization control by eliminating a deviation in synchronization between the master axis and the slave axis.

BRIEF DESCRIPTION OF THE DRAWINGS

FIG. 2 is a control block diagram of the standard PLC in an embodiment.

FIG. 3 is a first diagram describing motions of a master axis and a slave axis under synchronization control.

DETAILED DESCRIPTION

Example Use

Figure 1A:
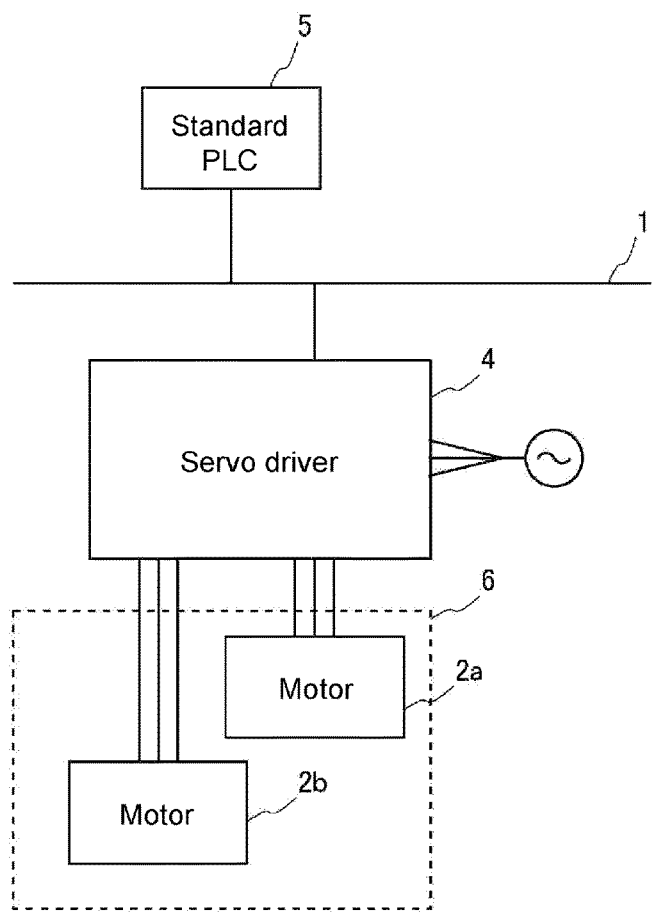
FIGS. 1A and 1B are schematic diagrams of a control system including a standard programmable logic controller (PLC) as a controller.

An example use of a controller according to one or more embodiments will now be described with reference to FIGS. 1A to 4. FIG. 1A is a schematic diagram of a control system including the controller. The control system includes a network 1, a servo driver 4, and a standard programmable logic controller (PLC) 5. The servo driver 4 is a servo controller for controlling a machine 6 through servo control. The machine 6 includes two motors 2a and 2b corresponding to two control axes. The control system shown in FIG. 1A includes the single servo driver 4 to drive the two control axes (motors). In some embodiments, the control system may include servo drivers 4 connected with a network 1 in a one-to-one correspondence with the control axes. The servo driver(s) 4 receives, from the standard PLC 5, a command for performing synchronization control for synchronizing two motors included in the machine 6. The standard PLC 5 corresponds to the controller in an aspect of the present disclosure.

The control system performs synchronization control for synchronizing the motors 2a and 2b in the machine 6 using commands received from the standard PLC 5. The synchronization control may be, for example, electronic cam control or electronic gear control. In the present embodiment, the control axis of the motor 2a is the master axis, and the motor 2a is the master axis drive. In the present embodiment, the control axis of the motor 2b is the slave axis, and the motor 2b is the slave axis drive. For such synchronization control, the standard PLC 5 calculates a position command for the motor 2b in every control period using position information about the motor 2a and outputs the position command to the motor 2b.

The machine 6 receives, from the standard PLC 5, a command for performing a predetermined task. The servo driver 4 controls the motors 2a and 2b through feedback control to cause the motors to follow the command. In response to the command, the servo driver 4 receives feedback signals output from encoders connected to the motors 2a and 2b, and feeds a drive current to the motors 2a and 2b to cause the output from each motor to follow the command. The current fed herein is an alternating current fed from an alternating-current power supply to the servo driver 4. In the present embodiment, the servo driver 4 receives a three-phase alternating current. In another embodiment, the servo driver 4 may receive a single-phase alternating current. The servo driver 4 herein may perform any feedback control. The components of the servo driver 4 are not essential in the embodiment of the present invention and will not be described in detail.

Figure 1B:
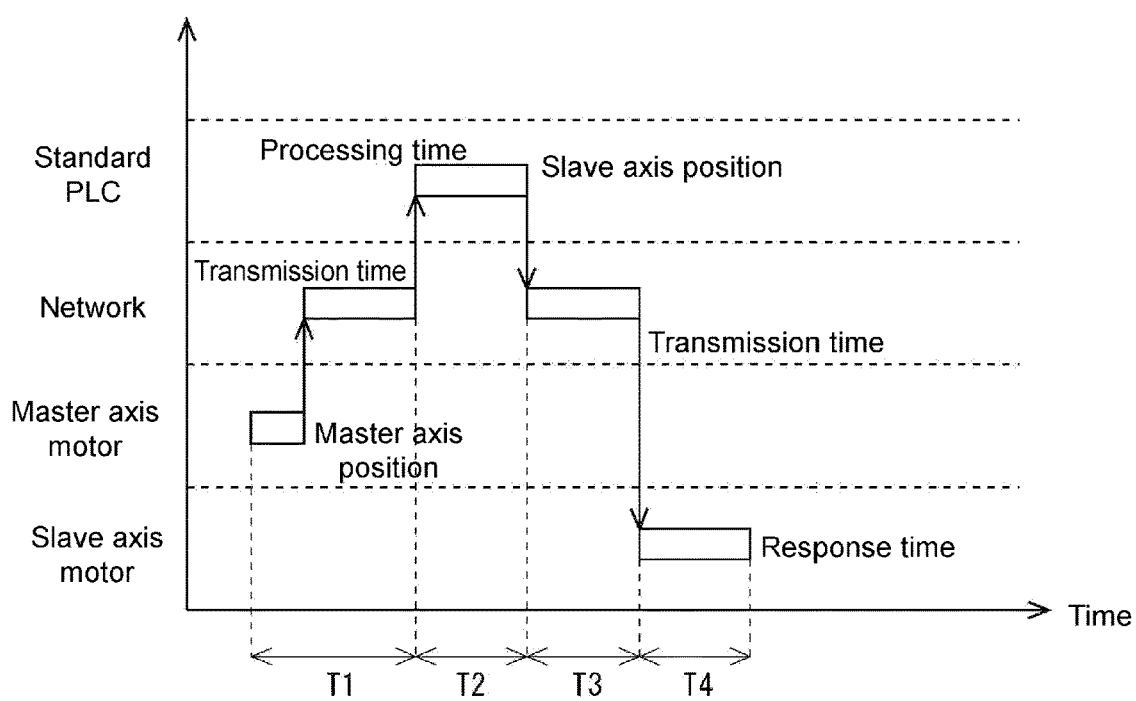

The control system can have a deviation in synchronization described below with reference to FIG. 1B. The control system can have a deviation in synchronization due to time T1 taken for the position of the master axis (the position of the motor 2a as the master axis drive) to be identified and the information about the master axis position to be input into the standard PLC 5 with the network 1, time T2 taken for a processor in the standard PLC 5 to perform an output in accordance with the position command (e.g., to transmit a signal indicating the position of the motor 2b as the slave axis drive) after receiving the information about the master axis position, time T3 (corresponding to a transmission delay herein) taken for the output to be input into the motor 2b with the network 1, and delay time T4 (corresponding to a control delay herein) resulting from servo control performed in the motor 2b. The delay time T4 associated with the slave axis includes the processing time taken by the servo driver 4 for the slave axis and a response delay caused by, for example, friction in the machine 6 associated with the motor 2b. The delay time T4 may be represented by, for example, the time from when the signal indicating the position of the slave axis is received by the motor 2b with the network 1 to when the signal is converted to an electrical signal and the value of an encoder connected to the motor 2b changes.

A delay associated with the master axis can be written as time T1+time T2, whereas a delay associated with the slave axis can be written as time T3+time T4. The standard PLC 5 compensates separately for a deviation in synchronization caused by the delay (T1+T2) associated with the master axis and for a deviation in synchronization caused by the delay (T3+T4) associated with the slave axis. The control structure of the standard PLC 5 will now be described with reference to FIG. 2. The standard PLC 5 generates commands (position commands) for the operations (or motions) of the motors 2a and 2b under synchronization control, and provides the command to the servo driver 4. The standard PLC 5 includes, as its functional units, a slave axis position command calculator 50, a slave axis correction value calculator 51, a generator 52, an adjuster 53, and a master axis shifter 55. The processes performed by these functional units are implemented based on arithmetic operations performed by an arithmetic operation unit included in the standard PLC 5. The standard PLC 5 further includes a storage (not shown), or memory, storing, for example, information used for synchronization control.

The master axis shifter 55 can calculate, using master axis position information and delay time T1[N] and delay time T2[N] in a control period N, a master axis shift (displacement of the master axis in period T1+T2) in the control period N as written in Formula 1 using master axis speed Vm[N] in the control period N.

$$\text{Master axis shift } [N] = Vm[N] \times (T1[N] + T2[N]) \tag{1}$$

In the present embodiment, the master axis position is shifted forward by the master axis shift to a shifted master axis position. The master axis shift [N] refers to a master axis shift in the control period N. In the formula, Vm[N], T1[N], and T2[N] are all values in the control period N.

The slave axis position command calculator 50 calculates the position command for the slave axis (corresponding to a reference position command herein) using the position of the shifted master axis and position information about the master axis. For synchronous operations using electronic gear control, the position command for the slave axis in the control period N can be calculated by Formula 2 using a gear ratio G.

$$\text{Slave axis position command } [N] = \text{Slave axis position command } [N-1] + G \times (\text{Shifted master axis position } [N] - \text{Shifted master axis position } [N-1]) \tag{2}$$

In this manner, the shifted master axis position is used to compensate for a deviation in synchronization caused by a delay associated with the master axis (T1+T2) in the control period N.

The slave axis correction value calculator 51 calculates a correction value in the control period N (slave axis displacement in period T3[N]+T4[N]) using slave axis speed command Vs[N] in the control period N calculated from the position command for the slave axis, and delay times T3[N] and T4[N] with, for example, the method written as Formula 3.

Slave axis correction value $[N] = Vs[N] \times (T3[N] + T4[N])$ (3)

The generator 52 applies the correction value for the slave axis calculated by the slave axis correction value calculator 51 to the position command for the slave axis calculated by the slave axis position command calculator 50 to generate a corrected position command. The generated corrected position command is output to the servo driver 4 for the motor 2b as the slave axis drive. The output position command is reflected in the operation of the motor 2b after the delay time T4 passes from the input into the servo driver 4. In this manner, the correction value for the slave axis is applied to the position command for the slave axis to compensate for a deviation in synchronization caused by the delay (T3+T4) associated with the slave axis.

Although the position command is corrected in this manner, the synchronization control may be destabilized when the speed of the motor 2a as the master axis drive changes. The adjuster 53 adjusts the correction value for the slave axis to reduce the instability of the synchronization control. The instability of the synchronization control will be described with reference to FIG. 3. A graph in the upper part of FIG. 3 shows the changing positions of the motors 2a and 2b during synchronization control. A graph in the lower part of FIG. 3 shows the changing correction values for the slave axis calculated by the slave axis correction value calculator 51. In these graphs, the horizontal axis indicates time. As time passes, the control period proceeds in the standard PLC 5.

In the upper part of FIG. 3, a line L1 represents the changing positions of the motor 2a as the master axis drive, and a line L2 represents the changing positions of the motor 2b as the slave axis drive without the position command being corrected. The line L1 starts at time t0 when the synchronization control is started. The line L2 starts at time t1 later than the line L1. The time difference between times t1 and t0 is due to the delay times T3 and T4 associated with the slave axis. A graph in the lower part of FIG. 3 shows the changing correction values for the slave axis as described above. The correction value for the slave axis is calculated based on a speed command Vs for the slave axis as written by Formula 3 above. The speed command Vs for the slave axis is further calculated from the position command for the slave axis. The position command for the slave axis is then calculated from the shifted master axis position as written by Formula 2 above. Thus, simultaneously as when the master axis starts changing its position, the correction value for the slave axis also changes from time t0 by a predetermined value ΔX1.

For such changing correction values for the slave axis, the generator 52 generates a corrected position command using the correction value for the slave axis directly applied to the slave axis position command. A line L3 in the upper part of FIG. 3 represents the changing positions of the motor 2b receiving the corrected command. A comparison between the lines L1 and L3 shows that the position of the motor 2b exceeds the position of the motor 2a in a predetermined period from when the speed of the motor 2a starts changing, or more specifically, in the period from time t0 to time t1 associated with the delay times T3 and T4, thus showing unstable synchronization control. At time t1 and later, the positional deviation between the two motors is eliminated.

Figure 4:
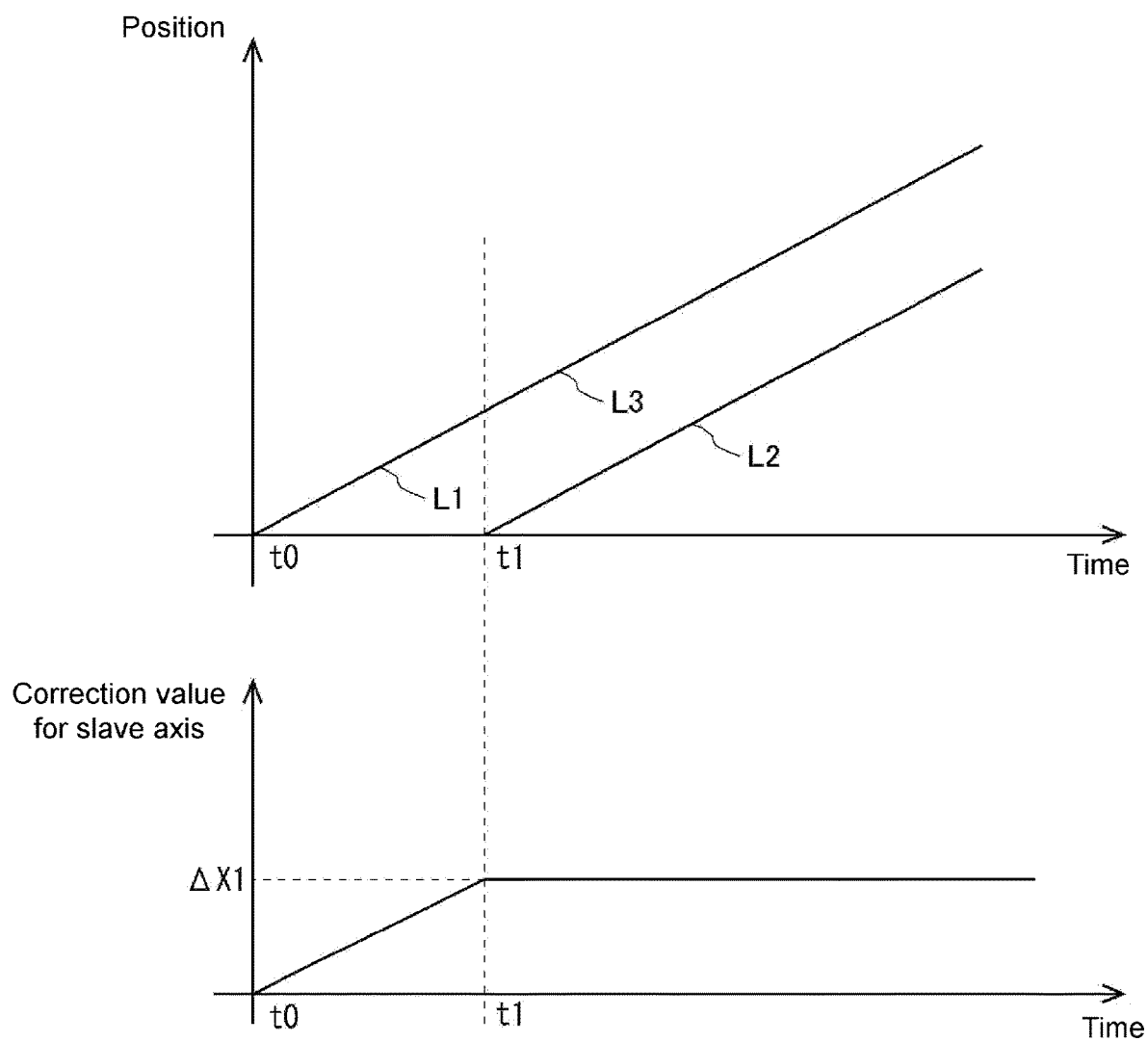
FIG. 4 is a second diagram describing motions of the master axis and the slave axis under synchronization control.

To reduce such instability of the synchronization control, the adjuster 53 adjusts the correction values for the slave axis to be applied to the slave axis position command by the generator 52. The adjuster 53 performs the adjustment described below with reference to FIG. 4. A line L1 in the upper part of FIG. 4 represents the changing positions of the motor 2a as the master axis drive, showing the same changes as indicated by the line L1 shown in FIG. 3. In the upper part of FIG. 4, a line L2 represents the changing positions of the motor 2b as the slave axis drive without the position command being corrected, showing the same changes as indicated by the line L2 shown in FIG. 3.

A graph in the lower part of FIG. 4 shows the changing correction values for the slave axis calculated with Formula 3 after the adjustment performed by the adjuster 53. In detail, in the predetermined period from time t0 to time t1, the correction value for the slave axis at its default of 0 gradually increases toward the value ΔX1 calculated by Formula 3, and then is adjusted to maintain the initially calculated value ΔX1 of the correction value for the slave axis at time t1 and later. In other words, the adjuster 53 adjusts, in the predetermined period from time t0 to time t1, the value to below the initially calculated value ΔX1. As indicated by a line L3 in FIG. 4, the changing positions of the motor 2b receiving the corrected position command generated by the generator 52 match the changing positions of the motor 2a indicated by the line L1. In this manner, the adjuster 53 adjusts the correction value for the slave axis in the predetermined period from time t0 to time t1 without the position of the motor 2b as the slave axis drive exceeding the position of the motor 2a as the master axis drive.

The adjuster 53 adjusts the correction value for the slave axis in this manner. The adjusted correction value for the slave axis is then applied to the slave axis position command by the generator 52 to generate a corrected position command for the motor 2b. The motor 2b receives the corrected position command with the network 1 through the servo driver 4 and undergoes servo control. The motor 2b can thus undergo intended synchronization control as shown in the upper part of FIG. 4, irrespective of the delay times T3 and T4.

Synchronization Control

Figure 5:
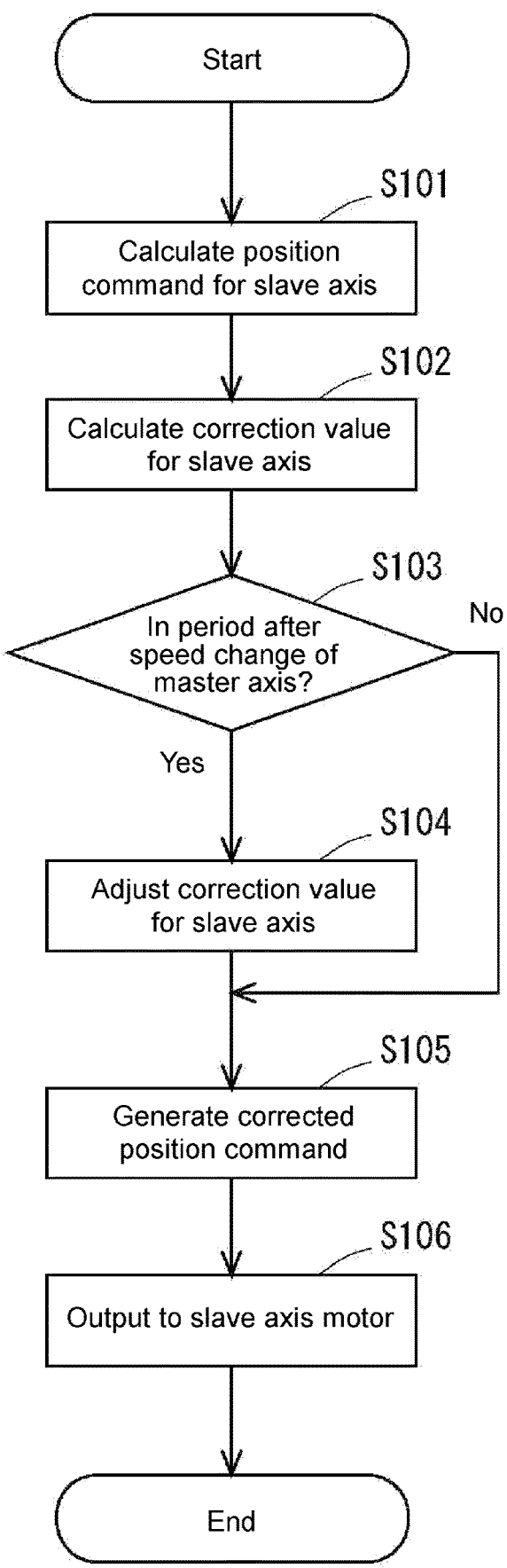
FIG. 5 is a flowchart of a synchronization control process for synchronizing the master axis and the slave axis.

The process of synchronization control for synchronizing the motor 2a and the motor 2b included in the machine 6 will now be described with reference to FIG. 5. The process shown in FIG. 5 is performed in every control period during synchronization control performed by the standard PLC 5. In step S101, the slave axis position command calculator 50 first calculates the position command for the slave axis as a reference position command. In step S102, the slave axis correction value calculator 51 then calculates the correction value for the slave axis with Formula 3 above. The calculated correction value for the slave axis has no adjustment by the adjuster 53.

In step S103, the determination is performed as to whether the current time is included in the predetermined period from when the speed of the motor 2a as the master axis drive changes. As described above, the predetermined period is associated with the delay times T3 and T4 and is prestored in a storage area of the standard PLC 5. In response to an affirmative determination result in step S103, the processing advances to step S104. In response to a negative determination result, the processing advances to step S105. In step S104, the adjuster 53 performs the adjustment. In the example shown in FIG. 4, the adjuster 53 adjusts the correction value for the slave axis from 0 at the start time t0 of the synchronization control to increase linearly over time to value ΔX1 calculated in step S102 in the predetermined period from time t0 to time t1. The adjustment performed by the adjuster 53 is not limited to this linear increase.

The adjuster 53 may adjust the correction value for the slave axis in accordance with the acceleration of the motor 2b in the predetermined period from time t0 to time t1. For example, the adjuster 53 may adjust the correction value for the slave axis within the range in which the acceleration of the motor 2b is below a permissible acceleration. The permissible acceleration may be set as appropriate for purposes such as protecting the motor 2b or the machine 6 or avoiding a decrease in the accuracy of a predetermined task performed by the machine 6. The set permissible acceleration is stored in a storage area of the standard PLC 5. The predetermined period from time t0 to time t1 is immediately after the speed change of the motor 2a. The position command for the slave axis to which the correction value for the slave axis has been applied in the predetermined period may cause the motor 2b to be easily under an external force or impact. To avoid this, the correction value for the slave axis is adjusted to cause the acceleration of the motor 2b to be below the permissible acceleration as described above. This promptly reduces a deviation in synchronization between the master axis and the slave axis while reducing vibrations or other factors associated with the motor 2b in synchronization control. After the processing is complete in step S104, the processing advances to step S105.

In step S105, the generator 52 generates a corrected position command. More specifically, the generator 52 generates a corrected position command using the correction value for the slave axis adjusted in step S104 in response to an affirmative determination result in step S103. The generator 52 generates a corrected position command directly using the correction value for the slave axis calculated in step S102 in response to a negative determination result in step S103. In step S106, the corrected position command is then output to the motor 2b with the network 1 through the servo driver 4.

The process shown in steps S101 to S106 is repeated in every control period to perform intended synchronization control for the motor 2a, irrespectively of the delay times T3 and T4, at any speed change of the motor 2a.

Other Embodiments

Figure 6:
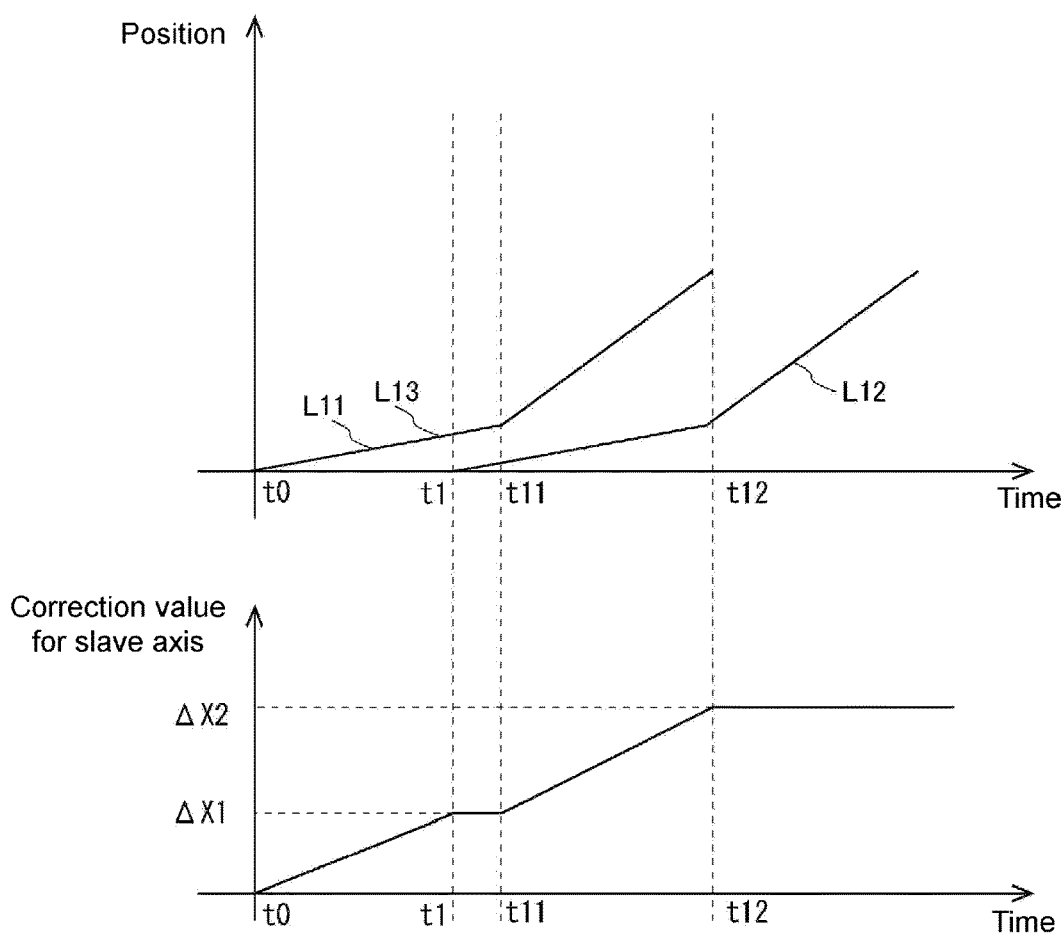
FIG. 6 is a third diagram describing motions of the master axis and the slave axis under synchronization control.

FIG. 6 shows another example of the procedure shown in FIG. 5. A line L11 in the upper part of FIG. 6 represents the changing positions of the motor 2a as the master axis drive. A line L12 shown in FIG. 6 represents the changing positions of the motor 2b as the slave axis drive without the position command being corrected. The synchronization control starts at time t0. The position changes in the same manner as shown in FIG. 4 until time t11 (t11>t1) at which the speed of the motor 2a increases further, followed by the motor 2b being synchronized with the motor 2a. More specifically, the speed changes for the second time at time t11 during the synchronization control. The predetermined period from time t11 to time t12 is thus defined for the second speed change.

At time t11, the motors 2a and 2b in synchronization control move at higher speeds than before. At time t11 and later, the slave axis correction value calculator 51 calculates a slave axis correction value ΔX2 larger than the above value ΔX1. In the predetermined period from time t11 to time t12, the adjuster 53 adjusts the correction value for the slave axis to increase linearly from the value ΔX1 to the value ΔX2. As indicated by a line L13 in the upper part of FIG. 6, this adjustment allows the changing positions of the motor 2b receiving the corrected position command generated by the generator 52 to match the changing positions of the motor 2a indicated by the line L11.

Example of Machine 6

Figure 7:
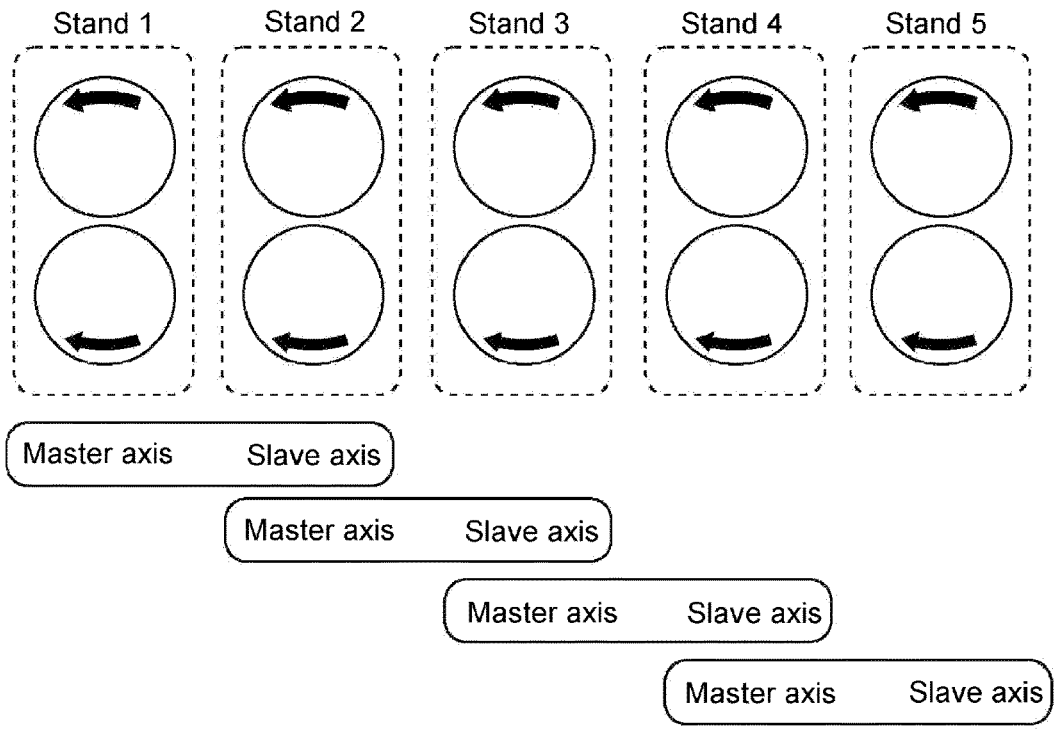
FIG. 7 is a schematic diagram of a rolling mill in which synchronization control is performed in multiple stages with a standard PLC as a controller.

The machine 6 may be, for example, a rolling mill shown in FIG. 7. The rolling mill includes five stands (stands 1 to 5) each including two rollers for a rolling process. The stands are arranged in series. Each of the stands 1 to 5 includes one roller connected to a motor, which is driven in accordance with a command from the standard PLC 5. The motor included in the stand 1 as a master axis and the motor included in the stand 2 as a slave axis are synchronized with each other, the motor included in the stand 2 as a master axis and the motor included in the stand 3 as a slave axis are synchronized with each other, the motor included in the stand 3 as a master axis and the motor included in the stand 4 as a slave axis are synchronized with each other, and the motor included in the stand 4 as a master axis and the motor included in the stand 5 as a slave axis are synchronized with each other. More specifically, in the rolling mill shown in FIG. 7, the motors in each of the combinations, stands 1 and 2, stands 2 and 3, stands 3 and 4, and stands 4 and 5, are synchronized with each other, and the combinations of these stands are also synchronized with each other. The rolling mill with synchronization control performed in multiple stages in this manner can have any deviations in synchronization control upstream being amplified in downstream stages, possibly causing less accurate rolling performance. However, the standard PLC herein reduces the likelihood of synchronization control being destabilized after the speed of the master axis drive changes and thus sufficiently reduces a decrease in the accuracy of the rolling process.

Appendix 1

A controller (5) for synchronizing a slave axis drive (2b) corresponding to a slave axis with a master axis drive (2a) corresponding to a master axis, the controller (5) comprising:
  a calculator (51) configured to calculate a correction value for a position command based on a transmission delay and a control delay included in outputting the position command from the controller (5) to the slave axis drive (2b), the transmission delay being a delay in transmitting the position command from the controller (5) to the slave axis drive (2b), the control delay being a delay in the slave axis drive (2b);
  a generator (52) configured to generate a corrected position command by applying the correction value to a reference position command for the slave axis drive (2b) calculated using position information about the master axis drive (2a); and an adjuster (53) configured to adjust, in a predetermined period from when a speed of the master axis drive (2a) changes, the correction value to be below a value calculated by the calculator (51) to cause a position of the slave axis drive (2b) to avoid exceeding a position of the master axis drive (2a).

REFERENCE SIGNS LIST 1 network
2a, 2b motor
5 standard PLC
50 slave axis position command calculator 51 slave axis correction value calculator
52 generator
53 adjuster
55 master axis shifter

The invention claimed is:

1. A control device configured to synchronize a slave axis drive corresponding to a slave axis with a master axis drive corresponding to a master axis by calculating a position command for the slave axis drive in every control period using position information of the master axis drive and outputting the position command to the slave axis drive, the master axis drive and the slave axis drive being included in a work machine, the control device comprising:
- a processor and a storage storing information used for synchronization control, the processor being programmed to function as:
- a calculator configured to calculate a correction value for a position command in every control period of the synchronization control based on a transmission delay and a control delay included in outputting the position command from the control device to the slave axis drive, the transmission delay being a delay in transmitting the position command from the control device to the slave axis drive, the control delay being a delay in the slave axis drive;
- a generator configured to generate a corrected position command in every control period of the synchronization control by applying the correction value to a reference position command for the slave axis drive calculated using position information about the master axis drive; and
- an adjuster configured to adjust, in a predetermined period of time from when a speed of the master axis drive changes during the synchronization control, the correction value calculated by the calculator to be less than the correction value calculated by the calculator in every control period of the synchronization control,
- wherein the generator is configured to generate the corrected position command by applying the adjusted correction value to the reference position command for the slave axis drive,
- the corrected position command being output from the control device to the slave axis drive to cause a position of the slave axis drive to match the position of the master axis drive during the predetermined period of time,
- wherein the processor is further programmed to determine whether a current time is within the predetermined period of time from when the speed of the master axis drive changes during the synchronization control,
- the adjuster adjusts the correction value calculated by the calculator to be less than the correction value calculated by the calculator in response to a determination that the current time is within the predetermined period of time from when the speed of the master axis drive changes during the synchronization control, and
- the adjuster does not adjust the correction value calculated by the calculator in response to a determination that the current time is not within the predetermined period of time from when the speed of the master axis drive changes during the synchronization control.

2. The control device according to claim 1, wherein the adjuster adjusts, in the predetermined period of time, the correction value for the reference position command to gradually approach the correction value calculated by the calculator over time.

3. The control device according to claim 1, wherein the adjuster adjusts, in the predetermined period of time, the correction value for the reference position command in a range in which an acceleration of the slave axis drive is below a permissible acceleration.

4. The control device according to claim 1, wherein the master axis drive and the slave axis drive are a pair of a master axis drive and a slave axis drive of a plurality of pairs of master axis drives and slave axis drives included in the work machine, and the control device performs synchronization control to synchronize a master axis drive and a slave axis drive in a pair of the plurality of pairs, and performs synchronization control to synchronize a pair of the plurality of pairs and another pair of the plurality of pairs.

5. The control device according to claim 1, wherein the predetermined period of time is determined based on a delay time associated with the slave axis.

* * * * *